United States Patent
Shibata et al.

(10) Patent No.: US 9,056,278 B2
(45) Date of Patent: Jun. 16, 2015

(54) EXHAUST GAS PURIFICATION APPARATUS FOR AN INTERNAL COMBUSTION ENGINE

(75) Inventors: Daisuke Shibata, Numazu (JP); Toru Kidokoro, Hadano (JP); Kazuya Takaoka, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/574,913

(22) PCT Filed: Sep. 20, 2011

(86) PCT No.: PCT/JP2011/071346
§ 371 (c)(1),
(2), (4) Date: Jul. 24, 2012

(87) PCT Pub. No.: WO2013/042189
PCT Pub. Date: Mar. 28, 2013

(65) Prior Publication Data
US 2014/0234174 A1    Aug. 21, 2014

(51) Int. Cl.
| B01D 53/00 | (2006.01) |
| B01D 53/92 | (2006.01) |
| B01D 53/94 | (2006.01) |
| F01N 9/00 | (2006.01) |
| F01N 3/035 | (2006.01) |
| F01N 3/10 | (2006.01) |
| F01N 3/20 | (2006.01) |
| F01N 11/00 | (2006.01) |

(52) U.S. Cl.
CPC ........ *B01D 53/9495* (2013.01); *B01D 53/9431* (2013.01); *B01D 53/944* (2013.01); *B01D 53/9477* (2013.01); *B01D 2251/2067* (2013.01); *F01N 3/106* (2013.01); *F01N 3/2066* (2013.01); *F01N 11/005* (2013.01); *F01N 3/035* (2013.01); *F01N 2550/04* (2013.01); *F01N 2560/05* (2013.01); *F01N 2900/0422* (2013.01); *F01N 2900/0601* (2013.01); *F01N 2900/1404* (2013.01); *F01N 2900/1411* (2013.01); *F01N 2900/1602* (2013.01); *F01N 2900/1622* (2013.01); *Y02T 10/47* (2013.01); *Y02T 10/24* (2013.01); *B01D 2257/404* (2013.01)

(58) Field of Classification Search
None
See application file for complete search history.

(56) References Cited

U.S. PATENT DOCUMENTS

| 2010/0229531 A1* | 9/2010 | Chi et al. ............ 60/274 |
| 2010/0242438 A1* | 9/2010 | Mital ................. 60/274 |

FOREIGN PATENT DOCUMENTS

| JP | 2009-85172 A | 4/2009 |
| JP | 2011-80439 A | 4/2011 |

OTHER PUBLICATIONS

International Search Report for PCT/JP2011/071346 dated Dec. 20, 2011.

*Primary Examiner* — Walter D Griffin
*Assistant Examiner* — Jelitza Perez
(74) *Attorney, Agent, or Firm* — Sughrue Mion, PLLC

(57) ABSTRACT

A reduction in the accuracy of a failure determination of a filter due to a reduction in the detection accuracy of a PM sensor is suppressed. In order to achieve this, provision is made for a filter that is arranged in an exhaust passage of an internal combustion engine for trapping particulate matter contained in an exhaust gas, an NOx selective reduction catalyst that is arranged at the downstream side of the filter and reduces NOx by means of a reducing agent which is supplied thereto, a supply device that supplies the reducing agent to the NOx selective reduction catalyst from the upstream side of the NOx selective reduction catalyst, a PM sensor that detects an amount of the particulate matter in the exhaust gas at the downstream side of the NOx selective reduction catalyst, and a prohibition part that prohibits the use of a detected value of the PM sensor in cases where the reducing agent supplied from said supply device passes through the NOx selective reduction catalyst.

8 Claims, 12 Drawing Sheets

EXHAUST GAS PURIFICATION APPARATUS FOR AN INTERNAL COMBUSTION ENGINE

CROSS REFERENCE TO RELATED APPLICATIONS

This application is a National Stage of International Application No. PCT/JP2011/071346 filed Sep. 20, 2011, the contents of which are incorporated herein by reference in their entirety.

TECHNICAL FIELD

The present invention relates to an exhaust gas purification apparatus for an internal combustion engine.

BACKGROUND ART

In an exhaust gas purification apparatus in which urea is supplied to an NOx selective reduction catalyst (hereinafter also referred to simply as an "NOx catalyst"), there has been known a technique in which when an amount of intermediate products, which have been generated in the course of the reaction from urea to ammonia and which have been accumulated in an exhaust passage, reaches an upper limit amount, the supply of urea water is prohibited (see, for example, a first patent document). According to this technique, a reducing agent can be supplied to the NOx catalyst until the amount of the intermediate products accumulated in the exhaust passage reaches the upper limit amount.

However, in the exhaust passage, there may be provided with a filter for trapping particulate matter (hereinafter also referred to as "PM"). In addition, in order to determine a failure of this filter, there may be provided with a PM sensor which serves to detect an amount of particulate matter in an exhaust gas. When the above-mentioned intermediate products adhere to an electrode or a cover of this PM sensor, there is a fear that it may become difficult to detect the amount of particulate matter in an accurate manner. In that case, there is also a fear that the accuracy in failure determination of the filter may become low.

PRIOR ART REFERENCES

Patent Document

[First Patent Document] Japanese patent application laid-open No. 2009-085172

SUMMARY OF THE INVENTION

Problems to be Solved by the Invention

The present invention has been made in view of the problems as referred to above, and has for its object to suppress a reduction in the accuracy of the failure determination of a filter due to a reduction in the detection accuracy of a PM sensor.

Means for Solving the Problems

In order to achieve the above-mentioned object, an exhaust gas purification apparatus for an internal combustion engine according to the present invention is provided with:

a filter that is arranged in an exhaust passage of the internal combustion engine for trapping particulate matter contained in an exhaust gas;

an NOx selective reduction catalyst that is arranged at the downstream side of said filter and reduces NOx by means of a reducing agent which is supplied thereto;

a supply device that supplies the reducing agent to said NOx selective reduction catalyst from the upstream side of said NOx selective reduction catalyst;

a PM sensor that detects an amount of the particulate matter in the exhaust gas at the downstream side of said NOx selective reduction catalyst; and a prohibition part that prohibits the use of a detected value of said PM sensor in a case where the reducing agent supplied from said supply device passes through said NOx selective reduction catalyst.

Here, when the reducing agent is supplied from the supply device, a part of the reducing agent may pass through the NOx selective reduction catalyst, and adhere to the PM sensor, depending on the state of the exhaust gas or the NOx selective reduction catalyst. When the reducing agent adheres to the PM sensor, an output value of the PM sensor will be changed, thus making it difficult to detect the particulate matter in an accurate manner. On the other hand, the prohibition part that prohibits the use of a detected value of the PM sensor in cases where the reducing agent passes through the NOx selective reduction catalyst. As a result of this, it is possible to suppress a reduction in the accuracy of the failure determination of the filter. The prohibition part may inhibit the failure determination of the filter, instead of prohibiting the use of the detected value of the PM sensor.

Here, note that the reducing agent passing through said NOx selective reduction catalyst includes a substance supplied from the supply device, substances finally produced from the substance supplied from the supply device, and intermediate products which ranges from the substance supplied from the supply device to the substances finally produced. Any of these substances reacts with NOx in the NOx selective reduction catalyst, so that the NOx is reduced.

In the present invention, the case where said reducing agent passes through said NOx selective reduction catalyst may be at least one of the following conditions which include: a condition in which the temperature of said NOx selective reduction catalyst is equal to or less than a threshold value; a condition in which the temperature of the exhaust gas is equal to or less than a threshold value; a condition in which the flow rate of the exhaust gas is equal to or larger than a threshold value; and a condition in which the amount of adsorption of the reducing agent in said NOx selective reduction catalyst is equal to or larger than a threshold value.

Here, when the temperature of the NOx selective reduction catalyst becomes low, it becomes difficult for the reducing agent to carry out reactions in the NOx selective reduction catalyst, and hence, it becomes easy for the reducing agent to pass through the NOx selective reduction catalyst. That is, there is a correlation between the temperature of the NOx selective reduction catalyst and the amount of the reducing agent passing through the NOx selective reduction catalyst. In addition, when the temperature of the exhaust gas at the upstream side of the NOx selective reduction catalyst becomes low, it becomes difficult for the reducing agent to carry out reactions in the NOx selective reduction catalyst, and hence, it becomes easy for the reducing agent to pass through the NOx selective reduction catalyst. That is, there is a correlation between the temperature of the exhaust gas and the amount of the reducing agent passing through the NOx selective reduction catalyst. Moreover, when the flow rate of the exhaust gas passing through the NOx selective reduction catalyst becomes large, it becomes easy for the reducing agent to pass through the NOx selective reduction catalyst before the reaction of the reducing agent in the NOx selective reduction catalyst ends. That is, there is a correlation between the flow rate of the exhaust gas and the amount of the reducing agent passing through the NOx selective reduction catalyst. Further, when the amount of reducing agent having adsorbed to the NOx selective reduction catalyst becomes large, it becomes difficult for a reducing agent to adsorb to the NOx selective reduction catalyst, and hence it becomes easy for the reducing agent to pass through the NOx selective reduction catalyst. That is, there is a correlation between the amount of adsorption of the reducing agent and the amount of the reducing agent passing through the NOx selective reduction catalyst.

Then, the use of the detected value of the PM sensor is prohibited in cases where there is satisfied at least one of the following conditions which include: a condition in which the temperature of the NOx selective reduction catalyst is equal to or less than a threshold value; a condition in which the temperature of the exhaust gas is equal to or less than a threshold value; a condition in which the flow rate of the exhaust gas is equal to or larger than a threshold value; and a condition in which the amount of adsorption of the reducing agent in the NOx selective reduction catalyst is equal to or larger than a threshold value. In these conditions, there is a fear that the detected value of the PM sensor may change under the influence of the reducing agent, and hence, if the detected value of the PM sensor is not used in these conditions, it will be possible to suppress a reduction in the accuracy of the failure determination of the filter.

Here, note that the threshold value in the temperature of the NOx selective reduction catalyst referred to herein can be set to an upper limit value of the temperature at which the reducing agent passes through the NOx selective reduction catalyst, or an upper limit value of the temperature at which the reducing agent adheres to the PM sensor. In addition, such a threshold value may also be set to a temperature of the NOx selective reduction catalyst at which the amount of reducing agent adhering to the PM sensor falls within an allowable range.

In addition, the threshold value in the temperature of the exhaust gas can be set to an upper limit value of the temperature at which the reducing agent passes through the NOx selective reduction catalyst, or an upper limit value of the temperature at which the reducing agent adheres to the PM sensor. Moreover, such a threshold value may also be set to a temperature of the exhaust gas at which the amount of reducing agent adhering to the PM sensor falls within an allowable range.

Also, the threshold value in the flow rate of the exhaust gas can be set to a lower limit value of the flow rate at which the reducing agent passes through the NOx selective reduction catalyst, or a lower limit value of the flow rate at which the reducing agent adheres to the PM sensor. Moreover, such a threshold value may also be set to a flow rate of the exhaust gas at which the amount of reducing agent adhering to the PM sensor falls within an allowable range. Here, note that the flow rate of the exhaust gas may be replaced with a flow speed of the exhaust gas.

Further, the threshold value in the amount of adsorption of the reducing agent can be set to a lower limit value of the amount of adsorption at which the reducing agent passes through the NOx selective reduction catalyst, or a lower limit value of the amount of adsorption at which the reducing agent adheres to the PM sensor. In addition, such a threshold value may also be set to an amount of adsorption of the reducing agent at which the amount of reducing agent adhering to the PM sensor falls within an allowable range. Here, note that the amount of adsorption of the reducing agent in the NOx selective reduction catalyst may also be replaced with the adsorption rate of the reducing agent in the NOx selective reduction catalyst. This adsorption rate is a value which is obtained by dividing the amount of reducing agent which has been adsorbed by a maximum amount of reducing agent which can be adsorbed.

Moreover, in the present invention, the condition in which said reducing agent passes through said NOx selective reduction catalyst may be a case where a value of any one of the following values, or a value which is obtained by multiplying two or more of the following values, is equal to or larger than a threshold value, wherein the values each represent an extent to which the reducing agent passes through said NOx selective reduction catalyst, and include: a value which increases in accordance with the decreasing temperature of said NOx selective reduction catalyst or the decreasing temperature of the exhaust gas; a value which increases in accordance with the increasing flow rate of the exhaust gas; and a value which increases in accordance with the increasing amount of adsorption of the reducing agent in said NOx selective reduction catalyst.

As the values, there are one which represents an extent to which the reducing agent passes through the NOx selective reduction catalyst under the influence of the temperature of the NOx selective reduction catalyst, one which represents an extent to which the reducing agent passes through the NOx selective reduction catalyst under the influence of the temperature of the exhaust gas, one which represents an extent to which the reducing agent passes through the NOx selective reduction catalyst under the influence of the flow rate of the exhaust gas, and one which represents an extent to which the reducing agent passes through the NOx selective reduction catalyst under the influence of the amount of adsorption of the reducing agent in the NOx selective reduction catalyst. The extent to which the reducing agent passes through the NOx selective reduction catalyst may be, for example, a proportion of the reducing agent which passes through the NOx selective reduction catalyst with respect to the reducing agent which flows into the NOx selective reduction catalyst. In addition, a value may also be a value which represents the magnitude in amount of the reducing agent which passes through the NOx selective reduction catalyst. For example, it may be such that the larger a value, the larger becomes the amount of the reducing agent which passes through the NOx selective reduction catalyst. By using these values, different physical quantities such as the temperature, the flow rate, and the amount of adsorption, can be handled in a similar manner. As a result, a determination as to whether the use of the PM sensor is prohibited can be made in an easy manner.

In the present invention, said prohibition part may prohibit the use of the detected value of said PM sensor, in a case where the amount of the reducing agent passing through said NOx selective reduction catalyst is equal to or larger than a threshold value.

The threshold value referred to herein can be set such that it is an amount of the reducing agent which passes through the NOx selective reduction catalyst, and that it is an amount of the reducing agent at the time when an influence of the reducing agent exerted on the detected value of the PM sensor exceeds an allowable range. In addition, the threshold value may also be set such that it is the amount of the reducing agent passing through the NOx selective reduction catalyst, and that it is a lower limit value of the amount of reducing agent at which the detected value of the PM sensor changes. That is, when the amount of the reducing agent passing through the NOx selective reduction catalyst becomes equal to or larger than the threshold value, the accuracy of the failure determination of the filter becomes low due to the influence of the reducing agent adhering to the PM sensor. On the other hand, if the use of the detected value of the PM sensor is prohibited in a case where the amount of the reducing agent passing through the NOx selective reduction catalyst is equal to or larger than the threshold value, it is possible to suppress the accuracy of the failure determination of the filter from being reduced.

In the present invention, the case where the amount of the reducing agent passing through said NOx selective reduction catalyst is equal to or larger than the threshold value may be at least one of the following conditions which include: a condition in which the temperature of said NOx selective reduction catalyst is equal to or less than a threshold value; a condition in which the temperature of the exhaust gas is equal to or less than a threshold value; a condition in which the flow rate of the exhaust gas is equal to or larger than a threshold value; and a condition in which the amount of adsorption of the reducing agent in said NOx selective reduction catalyst is equal to or larger than a threshold value.

Here, when the temperature of the NOx selective reduction catalyst becomes low, it becomes difficult for the reducing agent to carry out reactions in the NOx selective reduction catalyst, and hence, it becomes easy for the reducing agent to pass through the NOx selective reduction catalyst. That is, there is a correlation between the temperature of the NOx selective reduction catalyst and the amount of the reducing agent passing through the NOx selective reduction catalyst. Accordingly, if the temperature of the NOx selective reduction catalyst at the time when the amount of the reducing agent passing through the NOx selective reduction catalyst becomes equal to or larger than the threshold value is set as the threshold value of that temperature, it is possible to prohibit the use of the detected value of the PM sensor based on the temperature of the NOx selective reduction catalyst.

In addition, when the temperature of the exhaust gas becomes low, it becomes difficult for the reducing agent to carry out reactions in the NOx selective reduction catalyst, and hence, it becomes easy for the reducing agent to pass through the NOx selective reduction catalyst. That is, there is a correlation between the temperature of the exhaust gas and the amount of the reducing agent passing through the NOx selective reduction catalyst. Accordingly, if the temperature of the exhaust gas at the time when the amount of the reducing agent passing through the NOx selective reduction catalyst becomes equal to or larger than the threshold value is set as the threshold value of that temperature, it is possible to prohibit the use of the detected value of the PM sensor based on the temperature of the exhaust gas.

Moreover, when the flow rate of the exhaust gas becomes large, it becomes easy for the reducing agent to pass through the NOx selective reduction catalyst before the reaction of the reducing agent in the NOx selective reduction catalyst ends. That is, there is a correlation between the flow rate of the exhaust gas and the amount of the reducing agent passing through the NOx selective reduction catalyst. Accordingly, if the flow rate of the exhaust gas at the time when the amount of the reducing agent passing through the NOx selective reduction catalyst becomes equal to or larger than the threshold value is set as the threshold value of that flow rate, it is possible to prohibit the use of the detected value of the PM sensor based on the flow rate of the exhaust gas.

Further, when the amount of reducing agent having adsorbed to the NOx selective reduction catalyst becomes large, it becomes difficult for a reducing agent to adsorb to the NOx selective reduction catalyst, and hence it becomes easy for the reducing agent to pass through the NOx selective reduction catalyst. That is, there is a correlation between the amount of adsorption of the reducing agent and the amount of the reducing agent passing through the NOx selective reduction catalyst. Accordingly, if the amount of adsorption of the reducing agent at the time when the amount of the reducing agent passing through the NOx selective reduction catalyst becomes equal to or larger than the threshold value is set as the threshold value of that amount of adsorption, it is possible to prohibit the use of the detected value of the PM sensor based on the amount of adsorption of the reducing agent.

In the present invention, said prohibition part can calculate the amount of the reducing agent passing through said NOx selective reduction catalyst based on at least one of the temperature of said NOx selective reduction catalyst or the temperature of the exhaust gas, the flow rate of said exhaust gas, and the amount of adsorption of the reducing agent in said NOx selective reduction catalyst, in such a manner that the amount of the reducing agent passing through said NOx selective reduction catalyst becomes larger in accordance with the decreasing temperature of said NOx selective reduction catalyst or the decreasing temperature of the exhaust gas, or the increasing flow rate of the exhaust gas, or the increasing amount of adsorption of the reducing agent in said NOx selective reduction catalyst.

Here, there is a correlation between the temperature of the NOx selective reduction catalyst and the amount of the reducing agent passing through the NOx selective reduction catalyst, so that the lower the temperature of the NOx selective reduction catalyst, the larger becomes the amount of the reducing agent passing through the NOx selective reduction catalyst. In addition, there is a correlation between the temperature of the exhaust gas and the amount of the reducing agent passing through the NOx selective reduction catalyst, so that the lower the temperature of the exhaust gas, the larger becomes the amount of the reducing agent passing through the NOx selective reduction catalyst. Moreover, there is a correlation between the flow rate of the exhaust gas and the amount of the reducing agent passing through the NOx selective reduction catalyst, so that the larger the flow rate of the exhaust gas, the larger becomes the amount of the reducing agent passing through the NOx selective reduction catalyst. Further, there is a correlation between the amount of adsorption of the reducing agent in the NOx selective reduction catalyst and the amount of the reducing agent passing through the NOx selective reduction catalyst, so that the larger the amount of adsorption, the larger becomes the amount of the reducing agent passing through the NOx selective reduction catalyst. Based on these relations, it is possible to obtain the amount of the reducing agent passing through the NOx selective reduction catalyst.

In the present invention, the amount of the reducing agent passing through said NOx selective reduction catalyst may be calculated by multiplying an amount of the reducing agent supplied from said supply device by at least one of the following values which each represent an extent to which said reducing agent passes through said NOx selective reduction catalyst, and which include: a value which increases in accordance with the decreasing temperature of said NOx selective reduction catalyst or the decreasing temperature of the exhaust gas; a value which increases in accordance with the increasing flow rate of the exhaust gas; and a value which increases in accordance with the increasing amount of adsorption of the reducing agent in said NOx selective reduction catalyst.

As the values, there are one which represents an extent to which the reducing agent passes through the NOx selective reduction catalyst under the influence of the temperature of the NOx selective reduction catalyst, one which represents an extent to which the reducing agent passes through the NOx selective reduction catalyst under the influence of the temperature of the exhaust gas, one which represents an extent to which the reducing agent passes through the NOx selective reduction catalyst under the influence of the flow rate of the exhaust gas, and one which represents an extent to which the reducing agent passes through the NOx selective reduction catalyst under the influence of the amount of adsorption of the reducing agent in the NOx selective reduction catalyst. The extent to which the reducing agent passes through the NOx selective reduction catalyst is, for example, a proportion of the reducing agent which passes through the NOx selective reduction catalyst with respect to the reducing agent which flows into the NOx selective reduction catalyst. In addition, a value may also be a value which represents the magnitude in amount of the reducing agent which passes through the NOx selective reduction catalyst. By using these values, different physical quantities such as the temperature, the flow rate, and the amount of adsorption, can be handled in a similar manner. As a result of this, it is possible to calculate the amount of the reducing agent passing through the NOx selective reduction catalyst in an easy manner, so that a determination as to whether the use of the PM sensor is prohibited can be made in an easy manner.

In the present invention, said prohibition part can cancel the prohibition of the use of the detected value of said PM sensor in cases where after the use of the detected value of said PM sensor has been prohibited, the temperature of the exhaust gas in the surroundings of said PM sensor becomes a predetermined temperature at which the reducing agent having adhered to said PM sensor vaporizes, and in cases where a duration in which the temperature of the exhaust gas remains at this predetermined temperature becomes equal to or more than a predetermined period of time.

The reducing agent vaporizes at a relatively lower temperature than the particulate matter does. For this reason, even if the reducing agent has adhered to the PM sensor, it is possible to detect the particulate matter in a more accurate manner after the reducing agent thus adhered has been vaporized and removed. The predetermined period of time referred to herein can be a period of time required for the influence of the reducing agent having adhered to the PM sensor to decrease into an allowable range. In addition, the predetermined period of time may also be a period of time until all the reducing agent having adhered to the PM sensor vaporizes to a full extent. Moreover, the duration in which the temperature of the exhaust gas remains at the predetermined temperature need not be continuous. That is, in cases where the temperature of the exhaust gas becomes equal to or higher than the predetermined temperature in an intermittent or discontinuous manner, an accumulated or integrated value of durations in which the temperature of the exhaust gas is equal to or higher than the predetermined temperature should just be equal to or larger than the predetermined period of time.

Effect of the Invention

According to the present invention, it is possible to suppress a reduction in the accuracy of the failure determination of a filter due to a reduction in the detection accuracy of a PM sensor.

MODES FOR CARRYING OUT THE INVENTION

Hereinafter, reference will be made to specific embodiments of an exhaust gas purification apparatus for an internal combustion engine according to the present invention based on the attached drawings.

First Embodiment

Figure 1:
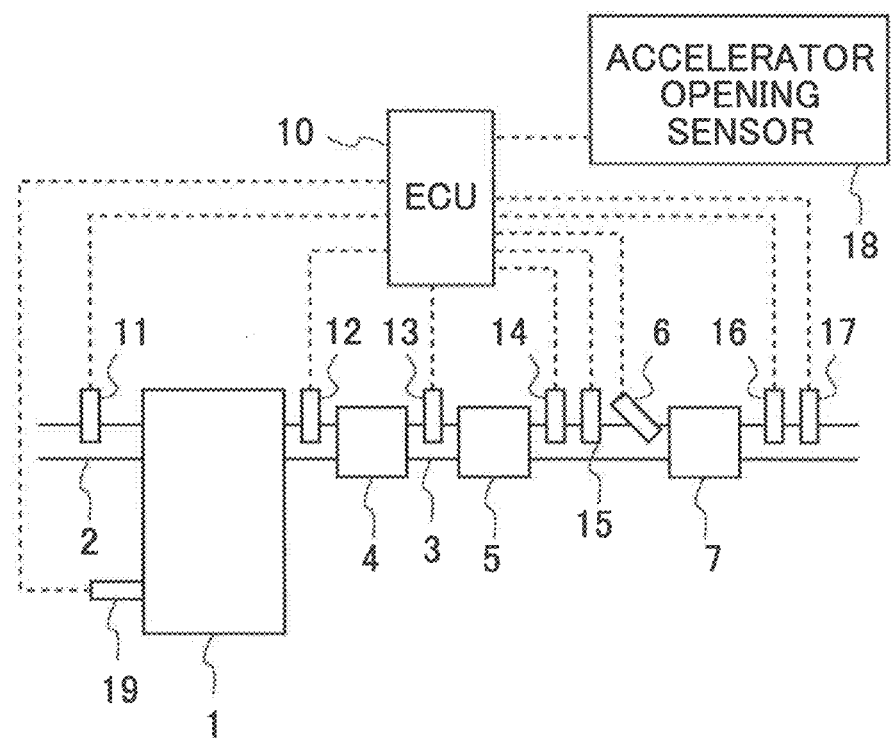
FIG. 1 is a view showing the schematic construction of an exhaust gas purification apparatus for an internal combustion engine according to embodiments of the present invention.

FIG. 1 is a view showing the schematic construction of an exhaust gas purification apparatus for an internal combustion engine according to this first embodiment of the present invention. An internal combustion engine 1 shown in FIG. 1 is a diesel engine, but it may be a gasoline engine.

An intake passage 2 and an exhaust passage 3 are connected to the internal combustion engine 1. In the intake passage 2, there is arranged an air flow meter 11 that serves to detect the amount of intake air flowing through the intake passage 2. On the other hand, in the exhaust passage 3, an oxidation catalyst 4, a filter 5, an injection valve 6, and an NOx selective reduction catalyst 7 (hereinafter referred to as the NOx catalyst 7) are sequentially arranged in this order from an upstream side in the direction of flow of an exhaust gas.

The oxidation catalyst 4 should just be a catalyst which has an oxidation ability, and may be a three-way catalyst, for example. The oxidation catalyst 4 may be supported on the filter 5.

The filter 5 traps PM (particulate matter) contained in the exhaust gas. Here, note that a catalyst may be supported on the filter 5. As the particulate matter is trapped by the filter 5, the particulate matter accumulates or deposits on the filter 5 gradually. Then, by carrying out so-called regeneration processing of the filter in which the temperature of the filter 5 is raised in a forced manner, the particulate matter deposited on the filter 5 can be oxidized and removed. For example, the temperature of the filter 5 can be raised by supplying HC to the oxidation catalyst 4. In addition, instead of providing with the oxidation catalyst 4, provision may also be made for other devices which serve to raise the temperature of the filter 5. Moreover, the temperature of the filter 5 may also be raised by causing hot gas to be discharged from the internal combustion engine 1.

The injection valve 6 injects a reducing agent. For the reducing agent, there can be used one derived from ammonia, such as, for example, urea water or the like. For example, the urea water injected from the injection valve 5 is hydrolyzed by the heat of the exhaust gas, as a result of which ammonia ($NH_3$) is produced, and a part or all thereof adsorbs to the NOx catalyst 7. In the following, it is assumed that urea water is injected as the reducing agent from the injection valve 6. Here, note that in this embodiment, the injection valve 6 corresponds to a supply device in the present invention.

The NOx catalyst 7 reduces the NOx in the exhaust gas in the existence of the reducing agent. For example, if ammonia is caused to be adsorbed to the NOx catalyst 7 in advance, it will be possible to reduce NOx by means of ammonia at the time when the NOx passes through the NOx catalyst 7.

A first exhaust gas temperature sensor 12 for measuring the temperature of the exhaust gas is arranged in the exhaust passage 3 at a location upstream of the oxidation catalyst 4. A second exhaust gas temperature sensor 13 for measuring the temperature of the exhaust gas is arranged in the exhaust passage 3 at a location downstream of the oxidation catalyst 4 and upstream of the filter 5. A third exhaust gas temperature sensor 14 for detecting the temperature of the exhaust gas and a first NOx sensor 15 for detecting the concentration of NOx in the exhaust gas are arranged in the exhaust passage 3 at locations downstream of the filter 5 and upstream of the injection valve 6. A second NOx sensor 16 for measuring the concentration of NOx in the exhaust gas and a PM sensor 17 for measuring the amount of particulate matter in the exhaust gas are arranged in the exhaust passage 3 at location downstream of the NOx catalyst 7. All of these sensors are not indispensable, but some of them can be provided as required.

In the internal combustion engine 1 constructed as stated above, there is arranged in combination therewith an ECU 10 which is an electronic control unit for controlling the internal combustion engine 1. This ECU 10 controls the internal combustion engine 1 in accordance with the operating conditions of the internal combustion engine 1 and/or driver's requirements.

The above-mentioned sensors, an accelerator opening sensor 18, which is able to detect an engine load by outputting an electrical signal corresponding to an amount of depression of an accelerator pedal, and a crank position sensor 19, which detects the number of revolutions per minute of the engine, are connected to the ECU 10 through electrical wiring, and the output signals of these sensors are inputted to the ECU 10. On the other hand, the injection valve 6 is connected to the ECU 10 through electrical wiring, so that the injection valve 6 is controlled by the ECU 10.

When the amount of particulate matter deposited on the filter 5 becomes equal to or more than a predetermined amount, the ECU 10 will carry out the above-mentioned regeneration processing of the filter 5. Here, note that the regeneration processing of the filter may be carried out at the time when the mileage or travel distance of a vehicle on which the internal combustion engine 1 is mounted becomes equal to or more than a predetermined distance. In addition, the regeneration processing of the filter may be carried out at each specified period of time.

In addition, the ECU 10 carries out failure determination of the filter 5 based on the amount of particulate matter detected by the PM sensor 17. Here, when a failure such as cracking of the filter 5 or the like occurs, the amount of particulate matter flowing through the filter 5 will increase. If the PM sensor 17 detects such an increase in the amount of particulate matter, the failure of the filter 5 can be determined.

For example, the failure determination of the filter 5 is carried out by making a comparison between an integrated value of the amount of particulate matter during a predetermined period of time calculated based on the detected value of the PM sensor 17, and an integrated value of the amount of particulate matter during the predetermined period of time in the case of assuming that the filter 5 is in a predetermined state.

Figure 2:
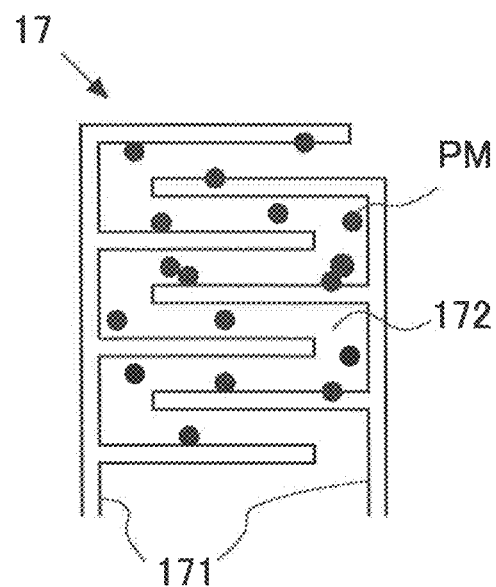
FIG. 2 is a view showing the schematic construction of a PM sensor.

Here, FIG. 2 is a schematic construction view of the PM sensor 17. The PM sensor 17 is a sensor that outputs an electrical signal corresponding to the amount of particulate matter deposited on itself. The PM sensor 17 is constructed to be provided with a pair of the electrodes 171, and an insulating material 172 arranged between the pair of the electrodes 171. If particulate matter adheres between the electrodes 171, the electric resistance between the electrodes 171 will change. Such a change of the electric resistance has a correlation to the amount of particulate matter in the exhaust gas, so that the amount of particulate matter in the exhaust gas can be detected based on the change of the electric resistance. This amount of particulate matter may also be a mass of particulate matter per unit time, or may also be a mass of particulate matter in a predetermined period of time. Here, note that the construction of the PM sensor 17 is not limited to what is shown in FIG. 2. That is, the PM sensor 17 should just be a PM sensor which serves to detect particulate matter and of which the detected value changes under the influence of the reducing agent.

Figure 3:
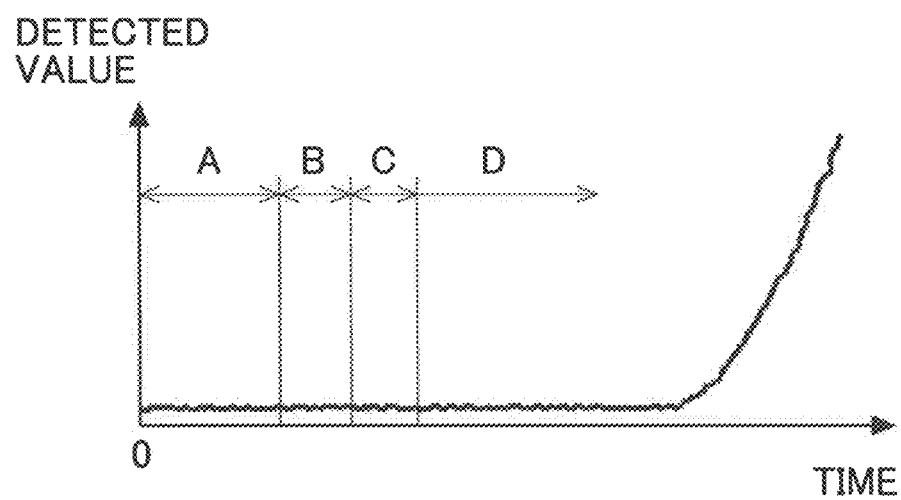
FIG. 3 is a time chart showing the change over time of a detected value of the PM sensor.

Next, FIG. 3 is a time chart showing the change over time of the detected value of the PM sensor 17. A period of time denoted by A immediately after starting of the internal combustion engine 1 is a period of time in which the water condensed in the exhaust passage 3 may adhere to the PM sensor 17. If the water adheres to the PM sensor 17, the detected value of the PM sensor 17 will change, or the PM sensor 17 will fail, and hence, in this period of time, the detection of the amount of particulate matter by means of the PM sensor 17 is not carried out.

In a period of time denoted by B after the period of time denoted by A, processing to remove the particulate matter adhered to the PM sensor 17 at the time of the last operation of the internal combustion engine 1 is carried out. This processing is carried out by raising the temperature of the PM sensor 17 to a temperature at which the particulate matter is oxidized. In this period of time denoted by B, too, the detection of the amount of particulate matter by means of the PM sensor 17 is not carried out.

A period of time denoted by C after the period of time denoted by B is a period of time required for the temperature of the PM sensor 17 to become a temperature suitable for the detection of particulate matter. That is, the temperature of the PM sensor 17 becomes higher than the temperature suitable for the detection of particulate matter in the period of time denoted by B, so it is waited until the temperature of the PM sensor 17 drops to reach the temperature suitable for the detection of particulate matter. In this period of time denoted by C, too, the detection of the amount of particulate matter by means of the PM sensor 17 is not carried out.

Then, the detection of particulate matter is carried out in a period of time denoted by D after the period of time denoted by C. Here, note that even in the period of time denoted by D, the detected value of the PM sensor 17 does not increase until a certain amount of particulate matter accumulates or deposits on the PM sensor 17. That is, the detected value begins to increase from a point in time at which a certain amount of particulate matter accumulates so that an electric current comes to flow between the electrodes 171. After that, the detected value increases according to the amount of particulate matter in the exhaust gas.

Here, the PM sensor 17 is arranged at a location downstream of the filter 5. For that reason, particulate matter, which has passed through the filter 5 without being trapped by the filter 5, adheres to the PM sensor 17. Accordingly, the amount of particulate matter deposited in the PM sensor 17 becomes an amount which corresponds to an integrated value of the amount of the particulate matter having passed through the filter 5.

Figure 4:
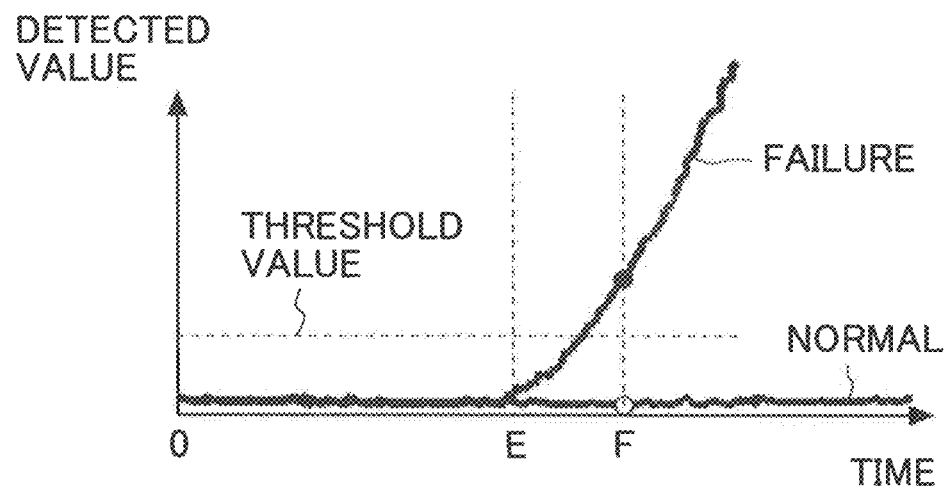
FIG. 4 is a time chart showing the change over time of the detected value of the PM sensor in the case of normal operation of a filter and in the case of a failure of the filter.

Here, FIG. 4 is a time chart showing the change over time of the detected value of the PM sensor 17 in the case of normal operation of the filter 5 and in the case of a failure of the filter 5. In cases where the filter 5 is in failure, particulate matter accumulates on the PM sensor 17 in an early period of time, so a point in time E at which the detected value of the PM sensor 17 begins to increase becomes earlier, as compared with the case in which the filter 5 is normal. For this reason, for example, if the detected value at the time when a predetermined period of time F has elapsed after the starting of the internal combustion engine 1 is equal to or more than a threshold value, it can be determined that the filter 5 is in failure. This predetermined period of time F is a period of time in which if the filter 5 is normal, the detected value of the PM sensor 17 will not increase, and whereas if the filter 5 is in failure, the detected value of the PM sensor 17 will increase. This predetermined period of time F is obtained through experiments, etc. In addition, the threshold value has also been obtained, through experiments or the like, as a lower limit value of the detected value of the PM sensor 17 at the time when the filter 5 is in failure.

However, it can also be considered that the PM sensor 17 is arranged at a location downstream of the filter 5 and upstream of the NOx catalyst 7. However, if the PM sensor 17 is arranged in such a position, the distance from the filter 5 to the PM sensor 17 will become short. For this reason, there is a fear that the particulate matter having passed through a cracked or split part of the filter 5 may arrive at areas surrounding the PM sensor 17 without being dispersed into the exhaust gas. As a result, depending on the position in which the filter 5 has cracked or split, particulate matter hardly adheres to the PM sensor 17, and hence, there is a fear that particulate matter may not be detected, and the accuracy of failure determination may be decreased.

In contrast to this, in this embodiment, the PM sensor 17 is arranged at the downstream side of the NOx catalyst 7, so the distance from the filter 5 to the PM sensor 17 is long. For this reason, the particulate matter having passed through the filter 5 disperses in the exhaust gas in the areas surrounding the PM sensor 17. Accordingly, the particulate matter can be detected without depending upon the cracked or split position of the filter 5. However, because the PM sensor 17 is arranged at the downstream side of the injection valve 6, there is a fear that the reducing agent injected from the injection valve 6 may adhere to the PM sensor 17. Such a reducing agent adhering to the PM sensor 17 is, for example, urea and its intermediate products (biuret, cyanuric acid) ranging from urea to ammonia. Thus, when the reducing agent adheres to the PM sensor 17, there is a fear that the detected value of the PM sensor 17 may change.

Figure 5:
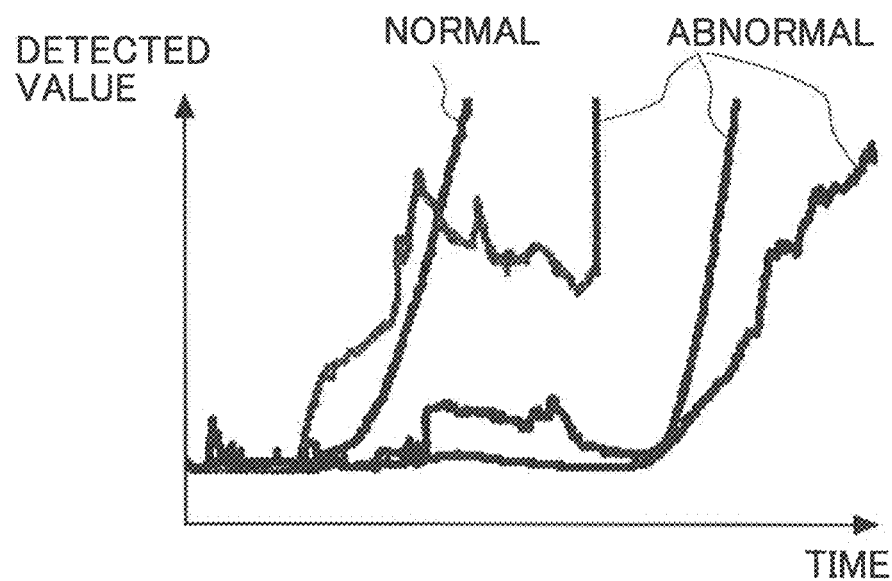
FIG. 5 is a time chart showing the change over time of the detected value of the PM sensor in the case of the detected value being normal and in the case of the detected value being abnormal.

Here, FIG. 5 is a time chart showing the change over time of the detected value of the PM sensor 17 in the case of the detected value being normal and in the case of the detected value being abnormal. The abnormal detected value can be set as a detected value at the time when the reducing agent has adhered to the PM sensor 17.

The normal detected value is a detected value which increases with the passage of time. That is, the detected value increases according to the amount of particulate matter having adhered to the PM sensor 17. On the other hand, the abnormal detected value may not only increase, but also decrease. Here, when the above-mentioned intermediate products have adhered to and deposited on the PM sensor 17 so that they become equal to or more than a predetermined amount, the detected value of the PM sensor 17 increases as in the case where particulate matter has accumulated. Here, biuret, which is an intermediate product, is generated at temperatures of 132 to 190 degrees C., and vaporizes when the temperature thereof becomes higher than those. In addition, cyanuric acid, which is also an intermediate product, is generated at temperatures of 190 to 360 degree C., and vaporizes when the temperature thereof becomes higher than those. Thus, as compared with particulate matter, the intermediate products vaporize at low temperatures. For this reason, the intermediate products having adhered to the PM sensor 17 vaporize when the temperature of the exhaust gas of the internal combustion engine 1 is high. As a result, the accumulation of the intermediate products decrease, so the detected value of the PM sensor 17 also decreases. This is a phenomenon that does not occur when only the particulate matter has accumulated or deposited on the PM sensor 17.

In addition, when the intermediate products adhere to and deposit on a cover of the PM sensor 17, there is a fear that the cover may be closed or blocked. When this cover is closed or blocked with the intermediate products, it becomes impossible for particulate matter to arrive at the electrodes 171, so the particulate matter is no longer detected. For that reason, there is also a fear that the accuracy in failure determination of the filter 5 may become low.

In this manner, when the reducing agent passes through the NOx catalyst 7, there is a fear that the failure determination of the filter 5 may become difficult. By taking into consideration that $NH_3$ is generally generated from urea water through thermal decomposition and hydrolysis, the following three factors can be considered as the cause of the fact that the reducing agent passes through the NOx catalyst 7.

(1) The temperature of the NOx catalyst 7 or the temperature of the exhaust gas is low. That is, when the temperature of the exhaust gas or the NOx catalyst 7 is low, the reaction of the reducing agent such as thermal decomposition thereof will take a relatively long time, so that the reducing agent will pass through the NOx catalyst 7 before the reaction of the reducing agent is completed.

(2) The flow rate of the exhaust gas passing through the NOx catalyst 7 is large. Here, note that the flow speed of the exhaust gas passing through the NOx catalyst 7 may be fast. That is, when the flow rate of the exhaust gas is large, a period of time for the reducing agent to be in contact with the NOx catalyst 7 becomes short, so that the reducing agent will pass through the NOx catalyst 7 before the reaction of the reducing agent is completed.

(3) The amount of the $NH_3$ having adhered to the NOx catalyst 7 is large. Here, note that the rate of adsorption of $NH_3$ may be high. The rate of adsorption of $NH_3$ is a ratio of the amount of the $NH_3$ having adhered to the NOx catalyst 7 with respect to a maximum amount of $NH_3$ which can be adsorbed to the NOx catalyst 7. That is, the larger the amount of the $NH_3$ having adhered to the NOx catalyst 7, the more difficult it becomes for hydrolysis to proceed, so that the reducing agent will pass through the NOx catalyst 7 before the reaction of the reducing agent is completed.

The above-mentioned factors (1) and (2) are phenomena which occur when the reaction time is short, and the above-mentioned factor (3) is a phenomenon which occurs due to a large amount of adsorption of $NH_3$.

In this embodiment, in cases where the reducing agent passes through the NOx catalyst 7 in this manner, the use of the detected value of the PM sensor 17 is prohibited. Here, note that, in this case, the failure determination of the filter 5 may be prohibited. Thus, in this embodiment, the ECU 10, which prohibits the use of the detected value of the PM sensor 17, corresponds to a prohibition part in the present invention.

Figure 6:
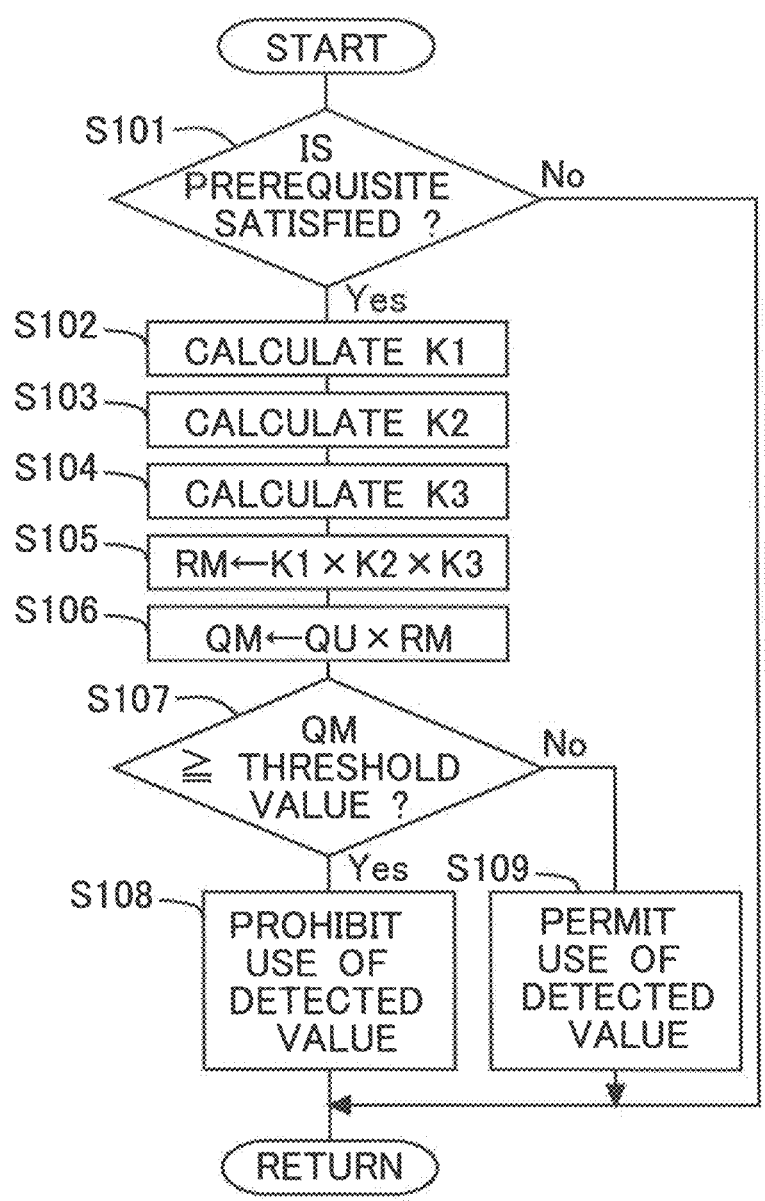
FIG. 6 is a flow chart showing a flow to inhibit the use of the detected value of the PM sensor according to a first embodiment of the present invention.

FIG. 6 is a flow chart showing a flow or routine to inhibit the use of the detected value of the PM sensor 17 according to this first embodiment of the present invention. This routine is carried out by means of the ECU 10 at each predetermined time interval.

In step S101, it is determined whether a prerequisite for supplying the reducing agent holds. In this step, it is determined whether it is possible to supply the reducing agent.

For example, when the various kinds of sensors are normal, a determination is made that the prerequisite for supplying the reducing agent holds. Whether the various kinds of sensors are normal or abnormal can be determined by means of well-known techniques. In addition, for example, when the operating state of the internal combustion engine 1 is an operating state suitable for the supply of the reducing agent, it is determined that the prerequisite for supplying the reducing agent is satisfied. In cases where an affirmative determination is made in step S101, the routine advances to step S102, whereas in cases where a negative determination is made, this routine is ended.

In step S102, a first coefficient K1 is calculated based on the flow rate of the exhaust gas passing through the NOx catalyst 7. This first coefficient K1 is a value which represents the proportion of an amount of the reducing agent, which passes through the NOx catalyst 7 due to a cause of a large flow rate of the exhaust gas, with respect to an amount of the reducing agent which flows into the NOx catalyst 7. Here, note that the first coefficient K1 may be calculated based on the flow speed of the exhaust gas passing through the NOx catalyst 7, instead of using the flow rate of the exhaust gas passing through the NOx catalyst 7. In addition, the flow rate of the exhaust gas passing through the NOx catalyst 7 may also be replaced with the flow rate of the exhaust gas or the flow speed of the exhaust gas flowing through the exhaust passage 3. The flow rate or the flow speed of the exhaust gas can be calculated based on the amount of intake air detected by the air flow meter 11.

Figure 7:
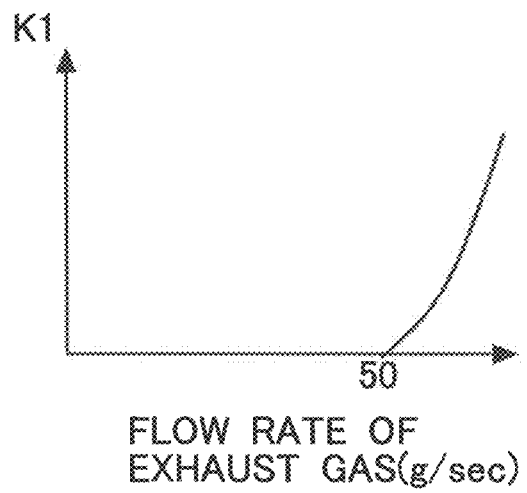
FIG. 7 is a view showing the relation between the flow rate of an exhaust gas passing through an NOx catalyst and a first coefficient K1.

Here, FIG. 7 is a view showing the relation between the flow rate of the exhaust gas passing through the NOx catalyst 7 and the first coefficient K1. Here, note that even if the flow rate of the exhaust gas is replaced with the flow speed of the exhaust gas, the same relation will result. Here, it is assumed that the reducing agent does not pass through the NOx catalyst 7 until the flow rate of the exhaust gas becomes 50 g/s, for example, and that the first coefficient K1 during such a period of time (i.e., below this flow rate) is a fixed value. Then, when the flow rate of the exhaust gas becomes 50 g/s or more, the first coefficient K1 will increase in accordance with an increase in the flow rate of the exhaust gas. That is, the larger the flow rate of the exhaust gas, the more it becomes easy for the reducing agent to pass though the NOx catalyst 7. For this reason, the larger the flow rate of the exhaust gas, the larger becomes the amount of the reducing agent passing through the NOx catalyst 7, so that the first coefficient K1 accordingly becomes larger. This relation has been beforehand obtained through experiments, etc., and stored in the ECU 10.

In step S103, a second coefficient K2 is calculated based on the temperature of the NOx catalyst 7. This second coefficient K2 is a value which represents the proportion of an amount of the reducing agent, which passes through the NOx catalyst 7 due to a cause of a low temperature of the NOx catalyst 7, with respect to the amount of the reducing agent which flows into the NOx catalyst 7. Here, note that the second coefficient K2 may be calculated based on the temperature of the exhaust gas, in place of the temperature of the NOx catalyst 7. The temperature of the exhaust gas may also be the temperature of the exhaust gas at the downstream side of the NOx catalyst 7, or may be the temperature of the exhaust gas which passes through the NOx catalyst 7. In addition, the temperature of the NOx catalyst 7 may also be a temperature detected by the third exhaust gas temperature sensor 14. Moreover, provision may be made for a sensor which serves to detect the temperature of the NOx catalyst 7, so that the temperature of the NOx catalyst 7 can be detected directly.

Figure 8:
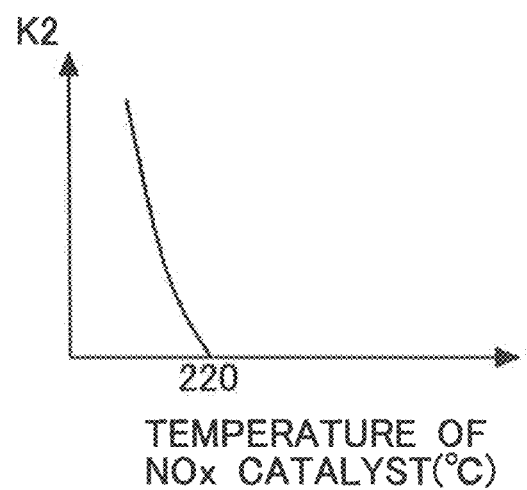
FIG. 8 is a view showing the relation between the temperature of the NOx catalyst and a second coefficient K2.

Here, FIG. 8 is a view showing the relation between the temperature of the NOx catalyst 7 and the second coefficient K2. Here, note that even if the temperature of the NOx catalyst 7 is replaced with the temperature of the exhaust gas, the same relation will result. When the temperature of the NOx catalyst 7 becomes equal to or higher than 220 degrees C., the reaction of the reducing agent will be facilitated by the fact that the temperature of the NOx catalyst 7 is high to a sufficient extent. For this reason, it is assumed that the reducing agent does not pass through the NOx catalyst 7 at temperatures of 220 degrees C. or higher, and that the second coefficient K2 during such a period of time (i.e., at these temperatures) is a fixed value. Then, when the temperature of the NOx catalyst 7 becomes less than 220 degrees C., the second coefficient K2 becomes larger in accordance with the decreasing or lowering temperature of the NOx catalyst 7. That is, the lower the temperature of the NOx catalyst 7, the more it becomes easy for the reducing agent to pass though the NOx catalyst 7. For this reason, the lower the temperature of the NOx catalyst 7, the larger becomes the amount of the reducing agent passing through the NOx catalyst 7, so that the second coefficient K2 accordingly becomes larger. This relation has been beforehand obtained through experiments, etc., and stored in the ECU 10.

In step S104, a third coefficient K3 is calculated based on the adsorption rate of $NH_3$ in the NOx catalyst 7. This third coefficient K3 is a value which represents the proportion of an amount of the reducing agent, which passes through the NOx catalyst 7 due to a cause of a high adsorption rate of $NH_3$ in the NOx catalyst 7, with respect to the amount of the reducing agent which flows into the NOx catalyst 7. The adsorption rate of $NH_3$ in the NOx catalyst 7 is a value which is obtained by dividing an amount of $NH_3$ having adsorbed to the NOx catalyst 7 by a maximum amount of $NH_3$ which can be adsorbed by the NOx catalyst 7. The amount of $NH_3$ having adsorbed to the NOx catalyst 7 can be obtained, for example, based on the amount of the supply of the reducing agent, the temperature of the NOx catalyst 7, the flow rate of the exhaust gas, etc. In addition, the maximum amount of $NH_3$ which can be adsorbed by the NOx catalyst 7 changes according to the temperature of the NOx catalyst 7 and the extent of the deterioration of the NOx catalyst 7, for example. These relations can be obtained through experiments, etc., in advance. Here, note that the adsorption rate of $NH_3$ in the NOx catalyst 7 can also be obtained by means of well-known techniques.

Figure 9:
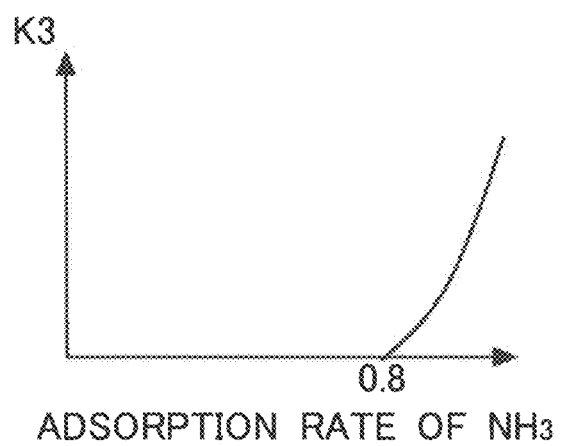
FIG. 9 is a view showing the relation between the adsorption rate of $NH_3$ in the NOx catalyst and a third coefficient K3.

Here, FIG. 9 is a view showing the relation between the adsorption rate of $NH_3$ in the NOx catalyst 7 and the third coefficient K3. Here, note that even if the adsorption rate of $NH_3$ is replaced with the amount of adsorption of $NH_3$, the same relation will result. Here, it is assumed that the reducing agent does not pass through the NOx catalyst 7 until the adsorption rate of $NH_3$ in the NOx catalyst 7 becomes 0.8, for example, and that the third coefficient K3 during such a period of time (i.e. below this adsorption rate) is a fixed value. Then, when the adsorption rate of $NH_3$ in the NOx catalyst 7 becomes 0.8 or more, the third coefficient K3 will increase in accordance with an increase in the adsorption rate of $NH_3$. That is, the higher the adsorption rate of $NH_3$, the more it becomes easy for the reducing agent to pass though the NOx catalyst 7. For this reason, the higher the adsorption rate of $NH_3$, the larger becomes the amount of the reducing agent passing through the NOx catalyst 7, so that the third coefficient K3 accordingly becomes larger. This relation has been beforehand obtained through experiments, etc., and stored in the ECU 10. In addition, the relation between the amount of the adsorption of $NH_3$ in the NOx catalyst 7 and the third coefficient K3 may also have been obtained through experiments, etc., and stored in the ECU 10. Here, note that in this embodiment, the first coefficient K1, the second coefficient K2 and the third coefficient K3 correspond to values in the present invention.

In step S105, a pass through coefficient RM is calculated. The pass through coefficient RM is a value which is obtained by multiplying the first coefficient K1 by the second coefficient K2 and the third coefficient K3. That is, the pass through coefficient RM is a value which represents the proportion of the amount of the reducing agent passing through the NOx catalyst 7 with respect to the amount of the reducing agent flowing into the NOx catalyst 7.

In step S106, an estimated amount of generation QM is calculated by multiplying the amount of the supply QU of the reducing agent by the pass through coefficient RM calculated in step S105. The estimated amount of generation QM is an estimated value of the amount of the reducing agent passing through the NOx catalyst 7. For the amount of the supply QU of the reducing agent, there can be used a command value which is calculated by the ECU 10. The amount of the supply QU of the reducing agent is set to a value which corresponds to an amount of NOx in the exhaust gas, for example. The amount of NOx in the exhaust gas can be estimated based on the operating state of the internal combustion engine 1.

In step S107, it is determined whether the estimated amount of generation QM is equal to or larger than a threshold value. This threshold value is an amount of the reducing agent which passes through the NOx catalyst 7, and is an amount of the reducing agent at the time when an influence of the reducing agent exerted on the detected value of the PM sensor 17 exceeds an allowable range. That is, when the estimated amount of generation QM becomes equal to or larger than the threshold value, the accuracy of the failure determination of the filter 5 will become low due to the influence of the reducing agent having adhered to the PM sensor 17.

In cases where an affirmative determination is made in step S107, the routine advances to step S108, whereas in cases where a negative determination is made, the routine advances to step S109.

In step S108, the use of the detected value of the PM sensor 17 is prohibited. In this step, the failure determination of the filter 5 may be prohibited. That is, because the amount of the reducing agent passing through the NOx catalyst 7 is large, there is a fear that the detected value of the PM sensor 17 may not be accurate, as a result of which the detected value of the PM sensor 17 should not be used. Here, note that the failure determination of the filter 5 may be carried out without using the PM sensor 17.

In step S109, the use of the detected value of the PM sensor 17 is permitted. That is, because there is almost no reducing agent which passes through the NOx catalyst 7, it can be said that the detected value of the PM sensor is accurate.

Here, note that in the flow shown in FIG. 6, the pass through coefficient RM is calculated by the use of all of the first coefficient K1, the second coefficient K2 and the third coefficient K3, but any one of these coefficients may instead be used as the pass through coefficient RM. In addition, any two of these coefficients may also be used as the pass through coefficient RM.

In addition, although in this embodiment, a determination as to whether the use of the detected value of the PM sensor 17 is prohibited is made by the use of the pass through coefficient RM, such a determination can also be made without the use of the pass through coefficient RM, the first coefficient K1, the second coefficient K2 and the third coefficient K3. That is, in cases where the amount of the reducing agent passing through the NOx catalyst 7 is equal to or larger than the threshold value, the use of the detected value of the PM sensor should be prohibited. In this case, the above-mentioned steps S102 through S106 are unnecessary. Then, in step S107, it is determined whether the amount of the reducing agent passing through the NOx catalyst 7 is equal to or larger than the threshold value. Similarly, in step S107, for example, it may be determined whether at least one of the following conditions is satisfied. That is, the flow rate of the exhaust gas or the flow speed of the exhaust gas passing through the NOx catalyst 7 is equal to or larger than a threshold value; the temperature of the NOx catalyst 7 or the temperature of the exhaust gas is equal to or less than a threshold value; and the adsorption rate of $NH_3$ in the NOx catalyst 7 or the amount of adsorption of $NH_3$ is equal to or larger than a threshold value. These threshold values have been beforehand obtained through experiments, etc., as values, respectively, at the time when the influence exerted on the detected value of the PM sensor 17 exceeds the allowable range.

As described above, according to this embodiment, in cases where there is a fear that the accuracy of the detected value of the PM sensor 17 may become low due to the reducing agent which passes through the NOx catalyst 7, the use of the detected value of the PM sensor 17 can be prohibited. As a result of this, the failure determination of the filter 5 using the detected value of the PM sensor 17 is no longer carried out, so it is possible to suppress an erroneous or incorrect determination from being made. That is, it is possible to suppress the reduction in the accuracy of the failure determination of the filter 5.

Second Embodiment

In the above-mentioned flow shown in FIG. 6, when the estimated amount of generation QM is equal to or larger than its threshold value, the use of the detected value of the PM sensor 17 is prohibited. This can be said that when the amount of the reducing agent passing through the NOx catalyst 7 exceeds the allowable range, the use of the detected value of the PM sensor 17 is prohibited. In contrast to this, in this second embodiment, in cases where the reducing agent passes through the NOx catalyst 7 without regard to the amount of the reducing agent passing through the NOx catalyst 7, the use of the detected value of the PM sensor 17 is prohibited. For example, when at least one of the following conditions is satisfied, the use of the detected value of the PM sensor 17 is prohibited. That is, the flow rate of the exhaust gas or the flow speed of the exhaust gas passing through the NOx catalyst 7 is equal to or larger than its threshold value; the temperature of the NOx catalyst 7 or the temperature of the exhaust gas is equal to or less than its threshold value; and the adsorption rate of $NH_3$ in the NOx catalyst 7 or the amount of adsorption of $NH_3$ is equal to or larger than its threshold value. These threshold values are set as values at which the reducing agent passes through the NOx catalyst 7. The other devices, parts and so on are the same as those in the first embodiment, so the explanation thereof is omitted.

Figure 10:
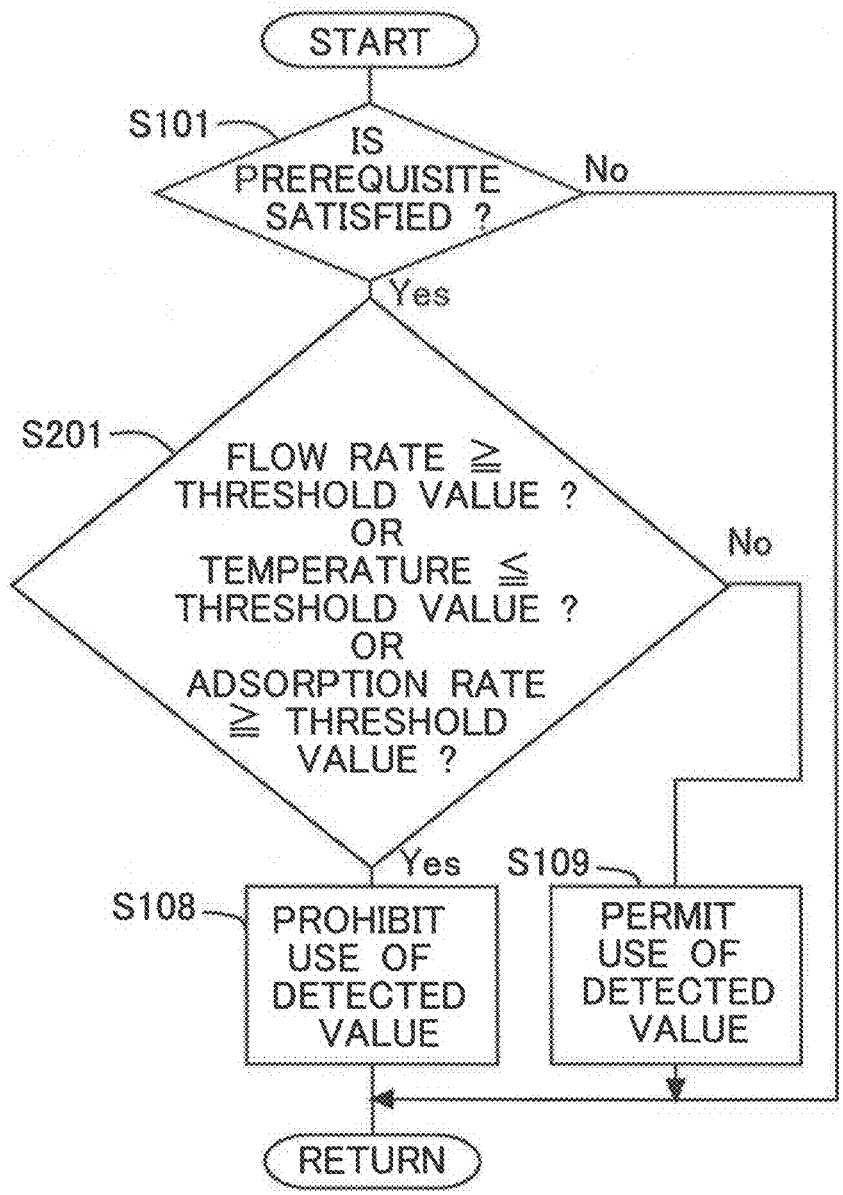
FIG. 10 is a flow chart showing a flow to inhibit the use of a detected value of a PM sensor according to a second embodiment of the present invention.

FIG. 10 is a flow chart showing a flow or routine to inhibit the use of the detected value of the PM sensor 17 according to this embodiment of the present invention. This routine is carried out by means of the ECU 10 at each predetermined time interval. Here, note that for those steps in which the same processing as in the flow shown in FIG. 6 is carried out, the same symbols are attached and an explanation thereof is omitted.

In cases where an affirmative determination is made in step S101, the routine advances to step S201. In step S201, it is determined whether at least one of the following conditions is satisfied. That is, the flow rate of the exhaust gas passing through the NOx catalyst 7 is equal to or larger than its threshold value; the temperature of the NOx catalyst 7 is equal to or less than its threshold value; and the adsorption rate of $NH_3$ in the NOx catalyst 7 is equal to or larger than its threshold value. These threshold values have been beforehand obtained through experiments or the like as values at which the reducing agent passes through the NOx catalyst 7. The flow rate of the exhaust gas may also be the flow speed of the exhaust gas. The temperature of the NOx catalyst 7 may also be the temperature of the exhaust gas. The adsorption rate of $NH_3$ in the NOx catalyst 7 may also be the amount of the adsorption of $NH_3$ in the NOx catalyst 7. Here, note that in step S201, it may be determined whether the reducing agent passes through the NOx catalyst 7.

Moreover, in step S201, similarly to the flow shown in FIG. 6, the first coefficient K1, the second coefficient K2, and the third coefficient K3 may be calculated, and a determination may be made as to whether the value of any of these coefficients is equal to or larger than its threshold value. In addition, a determination may also be made as to whether a value which is obtained by multiplying at least two of the first coefficient K1, the second coefficient K2 and the third coefficient K3 is equal to or larger than its threshold value. Further, a determination may also be made as to whether the pass through coefficient RM calculated in step S105 is equal to or larger than its threshold value. These threshold values have been beforehand obtained through experiments or the like as values at which the reducing agent passes through the NOx catalyst 7.

In cases where an affirmative determination is made in step S201, the routine advances to step S108, whereas in cases where a negative determination is made, the routine advances to step S109.

As described above, according to this embodiment, in cases where there is a fear that the accuracy of the detected value of the PM sensor 17 may become low due to the reducing agent which has passed through the NOx catalyst 7, the use of the detected value of the PM sensor 17 can be prohibited. As a result of this, the failure determination of the filter 5 using the detected value of the PM sensor 17 is no longer carried out, so it is possible to suppress an erroneous or incorrect determination from being made. That is, it is possible to suppress the reduction in the accuracy of the failure determination of the filter 5.

Third Embodiment

In this third embodiment, reference will be made to a condition in which the use of the detected value of the PM sensor 17 is permitted after the use of the detected value of the PM sensor 17 has been prohibited. The other devices, parts and so on are the same as those in the first embodiment, so the explanation thereof is omitted.

Here, even if the reducing agent has adhered to the PM sensor 17, the reducing agent will vaporize when the temperature of the PM sensor 17 or the temperature of the exhaust gas becomes high, so that the reducing agent is removed from the PM sensor 17. Then, when the reducing agent is removed from the PM sensor 17, the detection accuracy of particulate matter will become high, so that the failure determination of the filter 5 can be permitted.

Figure 11:
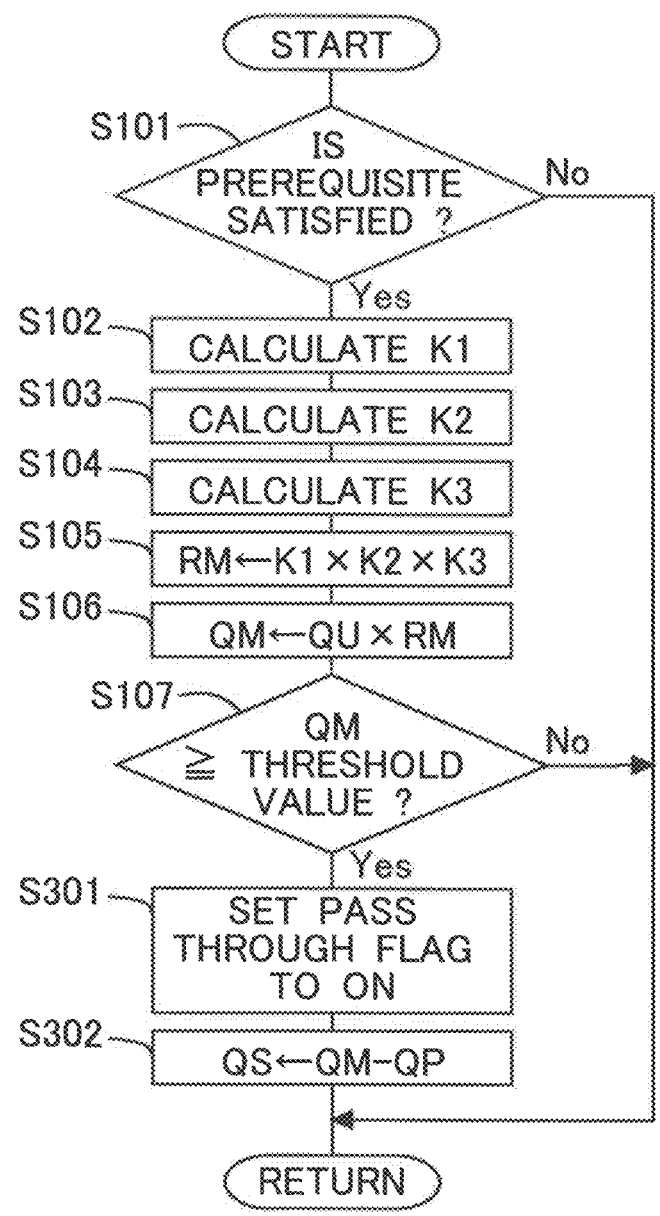
FIG. 11 is a flow chart showing a flow to set a pass through flag.

FIG. 11 is a flow chart showing a flow to set a pass through flag. This routine is carried out by means of the ECU 10 at each predetermined time interval. Here, note that for those steps in which the same processing as in the flow shown in FIG. 6 is carried out, the same symbols are attached and an explanation thereof is omitted.

In cases where an affirmative determination is made in step S107, the routine advances to step S301, and in step S301, a pass through flag is set to on. The pass through flag is a flag which turned on when the estimated amount of generation QM is larger than a threshold value. Here, note that an initial value of the pass through flag is off. In addition, when it is in a state where the reducing agent passes through the NOx catalyst 7, the pass through flag may be turned on.

In step S302, a pass through amount QS is calculated. The pass through amount QS is a value which is obtained by subtracting a threshold value QP used in step S107 from the estimated amount of generation QM. That is, an amount of the reducing agent, which has passed through the NOx catalyst 7 and which corresponds to a part of the reducing agent in excess of the allowable range is calculated as the pass through amount QS.

Figure 12:
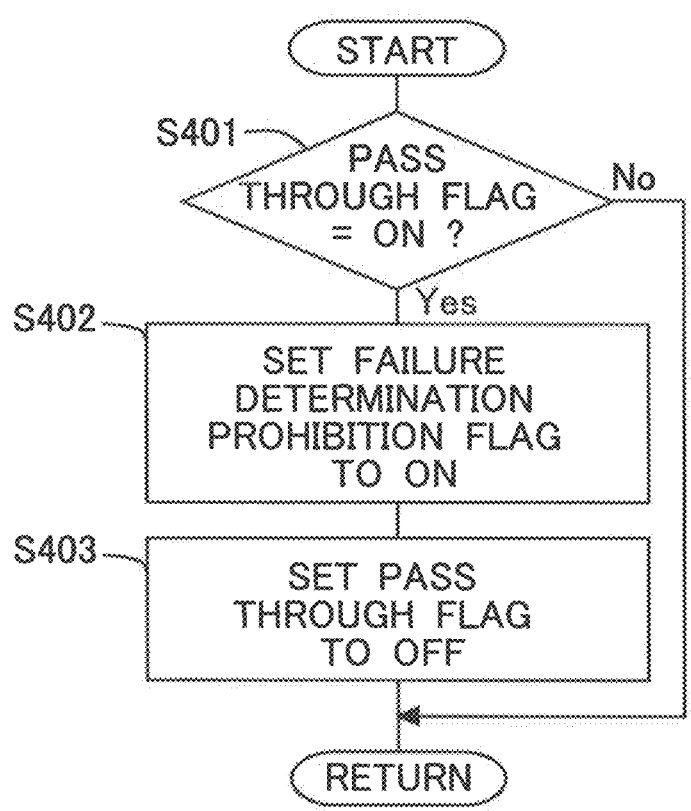
FIG. 12 is a flow chart showing a flow for determining whether a failure determination of a filter is made.

Next, FIG. 12 is a flow chart showing a flow or routine for determining whether the failure determination of the filter 5 is made. This routine is carried out by means of the ECU 10 at each predetermined time interval.

In step S401, it is determined whether the pass through flag is on. In cases where an affirmative determination is made in step S401, the routine advances to step S402, whereas in cases where a negative determination is made, this routine is ended.

In step S402, a failure determination prohibition flag is set to on. Here, the failure determination prohibition flag is set to on at the time of prohibiting the failure determination of the filter 5, and it is set to off at the time of permitting the failure determination of the filter 5. Accordingly, during the time when the failure determination prohibition flag is on, the failure determination of the filter 5 is prohibited. In addition, during the time when the failure determination prohibition flag is on, the use of the detected value of the PM sensor 17 may be prohibited. Here, note that an initial value of the failure determination flag is off.

Then, in step S403, the pass through flag is set to off.

Figure 13:
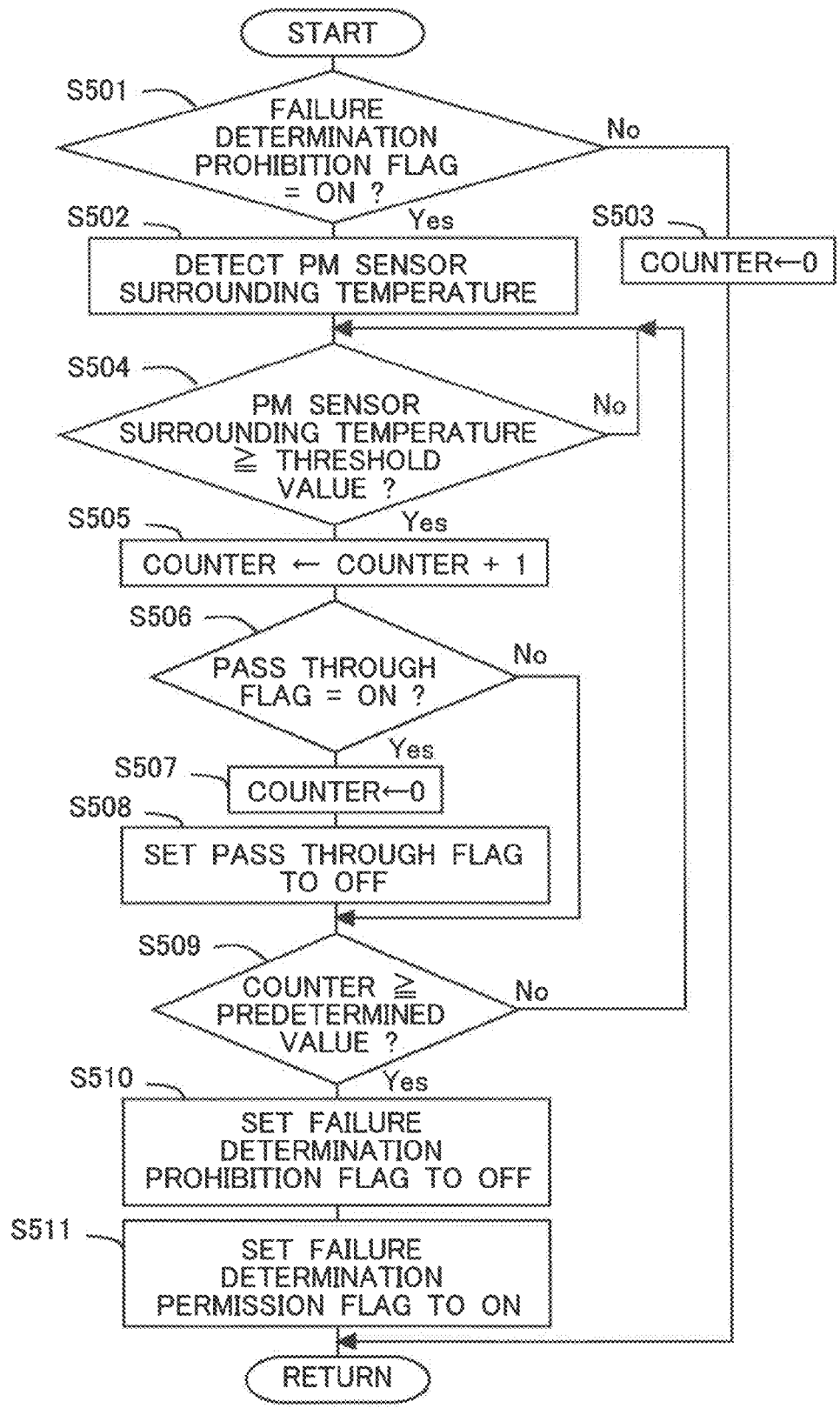
FIG. 13 is a flow chart showing a flow for making the pass through flag into an off state.

Next, FIG. 13 is a flow chart showing a flow or routine for making the pass through flag into an off state. This routine is carried out by means of the ECU 10 at each predetermined time interval.

In step S501, it is determined whether the failure determination flag is on. In cases where an affirmative determination is made in step S501, the routine advances to step S502, whereas in cases where a negative determination is made, the routine advances to step S503, in which the value of a counter is set to 0. This counter will be described later.

In step S502, the temperature in the surroundings of the PM sensor 17 is detected. Here, note that in this step, the temperature of the PM sensor 17 may be detected. The temperature in the surroundings of the PM sensor 17 may be detected by a temperature sensor which is arranged in the surroundings of the PM sensor 17, or may be estimated based on the detected value of the third exhaust gas temperature sensor 14.

In step S504, it is determined whether the temperature detected in step S502 is equal to or higher than its threshold value. The threshold value referred to herein is a lower limit value of a temperature at which the reducing agent having adhered to the PM sensor 17 vaporizes, and which is 350 degrees C., for example. In this step, it is determined whether the reducing agent having adhered to the PM sensor 17 vaporizes. That is, if the temperature detected in step S502 is equal to or higher than the threshold value, the reducing agent having adhered to the PM sensor 17 will vaporize, so that the amount of the reducing agent having adhered to the PM sensor 17 decreases.

In cases where an affirmative determination is made in step S504, the routine advances to step S505, and on the other hand, in cases where a negative determination is made, the step S504 is processed again. That is, the step S504 is processed in a repeated manner until a temperature is reached at which the reducing agent having adhered to the PM sensor 17 vaporizes.

In step S505, 1 is added to the counter. This counter is used to count the time elapsed from a point in time at which the reducing agent having adhered to the PM sensor 17 becomes a state in which it vaporizes.

In step S506, it is determined whether the pass through flag is on. In cases where the pass through flag is on, the estimated amount of generation QM is larger than the threshold value. In this case, the counter is set to 0, and the counting by the counter is redone.

In cases where an affirmative determination is made in step S506, the routine advances to step S507, whereas in cases where a negative determination is made, the routine advances to step S509.

In step S507, the value of the counter is set to 0, and then, in step S508, the pass through flag is set to off.

In step S509, it is determined whether the value of the counter is equal to or larger than a predetermined value. The predetermined value referred to herein is a value required to remove the reducing agent having adhered to the PM sensor 17 to a trouble-free amount. That is, the predetermined value is set as a lower limit value of the count value of the counter required until the reducing agent having adhered to the PM sensor 17 has vaporized to such an extent that the detected value of the PM sensor 17 becomes unaffected by the influence of the reducing agent.

In cases where an affirmative determination is made in step S509, the routine advances to step S510, whereas in cases where a negative determination is made, the routine returns to step S504. That is, the step S504 through the step S509 are processed in a repeated manner until the reducing agent having adhered to the PM sensor 17 is decreased to the trouble-free amount.

In step S510, the failure determination prohibition flag is set to off. That is, because the reducing agent having adhered to the PM sensor 17 has been removed therefrom and the detected value of the PM sensor 17 has become accurate, it becomes possible to carry out the failure determination of the filter 5 in an accurate manner. In cases where the failure determination prohibition flag has been set to off, the failure determination of the filter 5 is carried out if other conditions are satisfied.

In step S511, a failure determination permission flag is set to on. When this failure determination permission flag is on, it means that the state or condition is satisfied in which the failure determination of the filter 5 may be carried out. On the other hand, when the failure determination permission flag is off, it means that the state or condition is satisfied in which the failure determination of the filter 5 must not be carried out.

Figure 14:
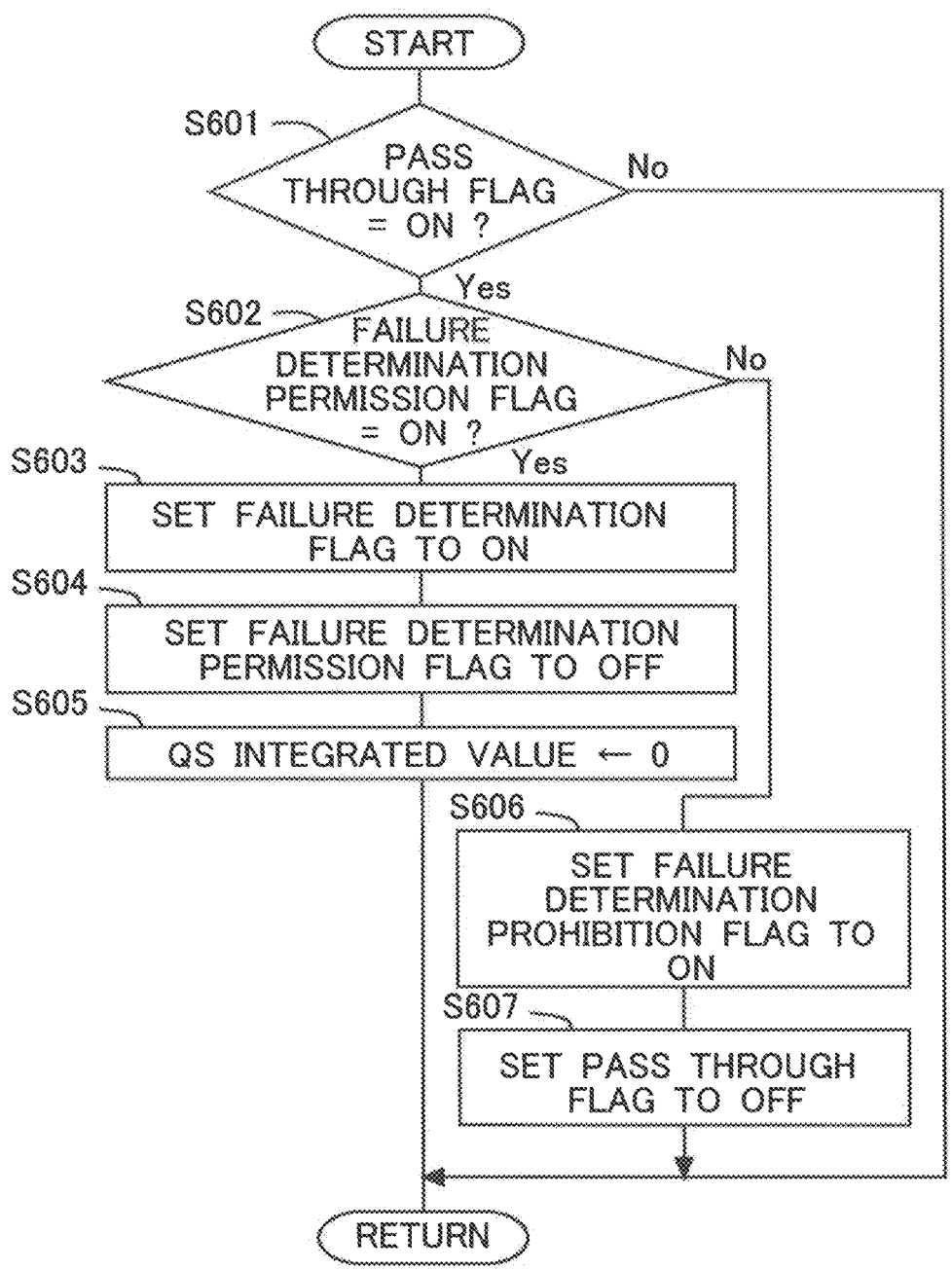
FIG. 14 is another flow chart showing a flow for determining whether a failure determination of a filter is made.

Next, FIG. 14 is another flow chart showing a flow or routine for determining whether the failure determination of the filter 5 is made. This routine can be carried out instead of the flow shown in FIG. 12.

In step S601, it is determined whether the pass through flag is on. In this step, the same processing as that in step S401 is carried out. In cases where an affirmative determination is made in step S601, the routine advances to step S602, whereas in cases where a negative determination is made, this routine is ended.

In step S602, it is determined whether the failure determination permission flag is on. That is, it is determined whether the state or condition is satisfied in which the failure determination of the filter 5 may be carried out. In cases where an affirmative determination is made in step S602, the routine advances to step S603, whereas in cases where a negative determination is made, the routine advances to step S606.

In step S603, the failure determination flag is set to on. When the failure determination flag is set to on, the failure determination of the filter 5 is carried out. Then, in step S604, the failure determination permission flag is set to off.

In step S605, an accumulated or integrated value of the pass through amount QS is calculated. The integrated value of the pass through amount QS is used in a flow shown in FIG. 15.

In step S606, the failure determination prohibition flag is set to on. Then, in step S607, the pass through flag is set to off.

Figure 15:
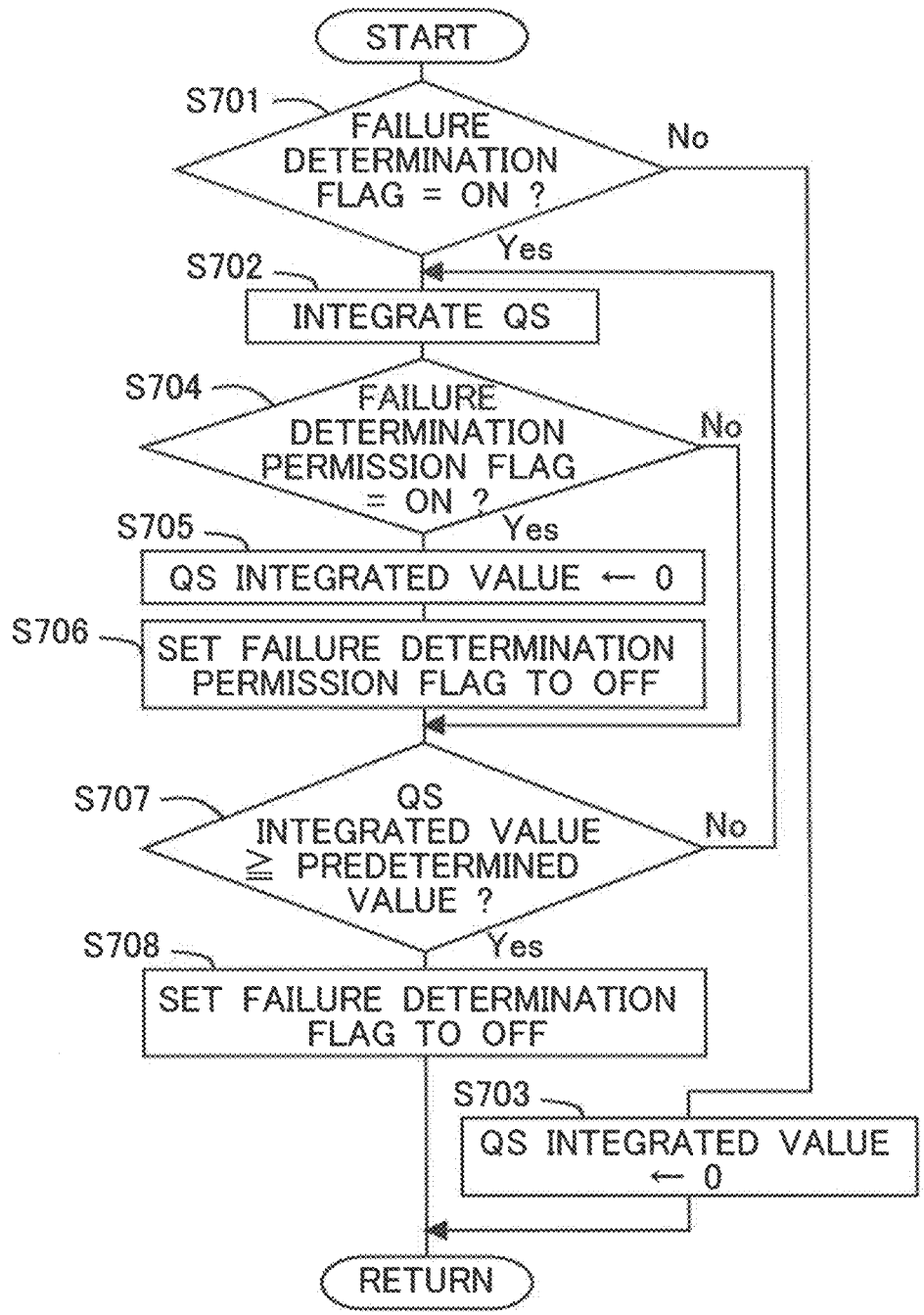
FIG. 15 is a flow chart showing a flow for making a failure determination flag into an off state.

Next, FIG. 15 is a flow chart showing a flow or routine for making the failure determination flag into an off state. This routine is carried out by means of the ECU 10 at each predetermined time interval.

In step S701, it is determined whether the failure determination flag is on. In cases where an affirmative determination is made in step S701, the routine advances to step S702, whereas in cases where a negative determination is made, the routine advances to step S703.

In step S702, the pass through amount QS is accumulated or integrated. The pass through amount QS is the value calculated in step S302. In this step, an amount of the reducing agent, which passes through the NOx catalyst 7 and exceeds the allowable range, is integrated. On the other hand, in step S703, the accumulated or integrated value of the pass through amount QS is set to 0.

In step S704, it is determined whether the failure determination permission flag is on. In cases where an affirmative determination is made in step S704, the routine advances to step S705, whereas in cases where a negative determination is made, the routine advances to step S707.

In step S705, the accumulated or integrated value of the pass through amount QS is set to 0. Then, in step S706, the failure determination permission flag is set to off.

In step S707, it is determined whether the accumulated or integrated value of the pass through amount QS is equal to or larger than a predetermined value. The predetermined value referred to herein is an accumulated or integrated value of the pass through amount QS at the time when the influence exerted on the detected value of the PM sensor 17 exceeds the allowable range. That is, when the accumulated or integrated value of the pass through amount QS becomes equal to or larger than a predetermined value, the accuracy of the failure determination of the filter 5 decreases due to the influence of the reducing agent having adhered to the PM sensor 17. Accordingly, in cases where an affirmative determination is made in step S707, the routine advances to step S708, in which the failure determination flag is set to off. That is, the failure determination of the filter 5 is not carried out.

On the other hand, in cases where a negative determination is made in step S707, the routine returns to step S702. That is, the step S702 through the step S707 are processed in a repeated manner until the accumulated or integrated value of the pass through amount QS becomes equal to or larger than the predetermined value.

As described above, according to this embodiment, when the reducing agent has adhered to the PM sensor 17, thus giving rise to a fear that the accuracy of the failure determination of the filter 5 may reduce, the use of the detected value of the PM sensor 17 is prohibited. As a result of this, it is possible to suppress the reduction in the accuracy of the failure determination of the filter 5. On the other hand, by carrying out the failure determination of the filter 5 when the reducing agent having adhered to the PM sensor 17 has vaporized, it is possible to enhance the accuracy of the failure determination.

EXPLANATION OF REFERENCE NUMERALS AND CHARACTERS

1 internal combustion engine
2 intake passage
3 exhaust passage
4 oxidation catalyst
5 filter
6 fuel injection valve
7 NOx selective reduction catalyst
10 ECU
11 air flow meter
12 first exhaust gas temperature sensor
13 second exhaust gas temperature sensor
14 third exhaust gas temperature sensor
15 first NOx sensor
16 second NOx sensor
17 PM sensor
18 accelerator opening sensor
19 crank position sensor

The invention claimed is:

1. An exhaust gas purification apparatus for an internal combustion engine comprising:
a filter that is arranged in an exhaust passage of the internal combustion engine for trapping particulate matter contained in an exhaust gas;
an NOx selective reduction catalyst that is arranged at the downstream side of said filter and uses a reducing agent which is supplied thereto to reduce NOx;
an injection valve that supplies the reducing agent to said NOx selective reduction catalyst from the upstream side of said NOx selective reduction catalyst;
a PM sensor that detects an amount of the particulate matter in the exhaust gas at the downstream side of said NOx selective reduction catalyst; and
an electronic control unit programmed to use a detected value of said PM sensor to determine a failure of said PM sensor and to prohibit a use of the detected value of said PM sensor in a case where the reducing agent supplied from said injection valve passes through said NOx selective reduction catalyst.

2. The exhaust gas purification apparatus for an internal combustion engine as set forth in claim 1, wherein
the electronic control unit determines that said reducing agent passes through said NOx selective reduction catalyst when at least one of the following conditions is detected: a condition in which the temperature of said NOx selective reduction catalyst is equal to or less than a threshold value; a condition in which the temperature of the exhaust gas is equal to or less than a threshold value; a condition in which the flow rate of the exhaust gas is equal to or larger than a threshold value; and a condition in which the amount of adsorption of the reducing agent in said NOx selective reduction catalyst is equal to or larger than a threshold value.

3. The exhaust gas purification apparatus for an internal combustion engine as set forth in claim 1, wherein
the electronic control unit determines that said reducing agent passes through said NOx selective reduction catalyst when a value of any one of the following values, or a value which is obtained by multiplying two or more of the following values, is equal to or larger than a threshold value, wherein the values each represent an extent to which said reducing agent passes through said NOx selective reduction catalyst, and include: a value which increases in accordance with the decreasing temperature of said NOx selective reduction catalyst or the decreasing temperature of the exhaust gas; a value which increases in accordance with the increasing flow rate of the exhaust gas; and a value which increases in accordance with the increasing amount of adsorption of the reducing agent in said NOx selective reduction catalyst.

4. The exhaust gas purification apparatus for an internal combustion engine as set forth in claim 1, wherein
said electronic control unit prohibits the use of the detected value of said PM sensor, in a case where an amount of the reducing agent passing through said NOx selective reduction catalyst is equal to or larger than a threshold value.

5. The exhaust gas purification apparatus for an internal combustion engine as set forth in claim 4, wherein
said electronic control unit determines that an amount of the reducing agent passing through said NOx selective reduction catalyst is equal to or larger than a threshold value when at least one of the following conditions is determined: a condition in which the temperature of said NOx selective reduction catalyst is equal to or less than a threshold value; a condition in which the temperature of the exhaust gas is equal to or less than a threshold value; a condition in which the flow rate of the exhaust gas is equal to or larger than a threshold value; and a condition in which the amount of adsorption of the reducing agent in said NOx selective reduction catalyst is equal to or larger than a threshold value.

6. The exhaust gas purification apparatus for an internal combustion engine as set forth in claim 4, wherein
said electronic control unit calculates the amount of the reducing agent passing through said NOx selective reduction catalyst based on at least one of the temperature of said NOx selective reduction catalyst or the temperature of the exhaust gas, the flow rate of said exhaust gas, and the amount of adsorption of the reducing agent in said NOx selective reduction catalyst, in such a manner that the amount of the reducing agent passing through said NOx selective reduction catalyst becomes larger in accordance with the decreasing temperature of said NOx selective reduction catalyst or the decreasing temperature of the exhaust gas, or the increasing flow rate of the exhaust gas, or the increasing amount of adsorption of the reducing agent in said NOx selective reduction catalyst.

7. The exhaust gas purification apparatus for an internal combustion engine as set forth in claim 4, wherein
the electronic control unit calculates the amount of the reducing agent passing through said NOx selective reduction catalyst by multiplying an amount of the reducing agent supplied from said injection valve by at least one of the following values which each represent an extent to which said reducing agent passes through said NOx selective reduction catalyst, and which include: a value which increases in accordance with the decreasing temperature of said NOx selective reduction catalyst or the decreasing temperature of the exhaust gas; a value which increases in accordance with the increasing flow rate of the exhaust gas; and a value which increases in accordance with the increasing amount of adsorption of the reducing agent in said NOx selective reduction catalyst.

8. The exhaust gas purification apparatus for an internal combustion engine as set forth in claim 1, wherein
said electronic control unit cancels the prohibition of the use of the detected value of said PM sensor in cases where after the use of the detected value of said PM sensor has been prohibited, the temperature of the exhaust gas in the surroundings of said PM sensor becomes a predetermined temperature at which the reducing agent having adhered to said PM sensor vaporizes, and in cases where a duration in which the temperature of the exhaust gas remains at this predetermined temperature becomes equal to or more than a predetermined period of time.

* * * * *